US012789758B2

(12) United States Patent
Carpenter

(10) Patent No.: US 12,789,758 B2
(45) Date of Patent: Nov. 10, 2026

(54) STABILIZER PAD FOR STABILIZING ARM

(71) Applicant: Broken Tractor, LLC, Baton Rouge, LA (US)

(72) Inventor: Thomas Chance Carpenter, Baton Rouge, LA (US)

(73) Assignee: Broken Tractor LLC, Baton Rouge, LA (US)

( * ) Notice: Subject to any disclaimer, the term of this patent is extended or adjusted under 35 U.S.C. 154(b) by 0 days.

(21) Appl. No.: 19/249,051

(22) Filed: Jun. 25, 2025

(65) Prior Publication Data

US 2026/0054697 A1 Feb. 26, 2026

Related U.S. Application Data

(60) Provisional application No. 63/664,015, filed on Jun. 25, 2024.

(51) Int. Cl.
*B60S 9/04* (2006.01)

(52) U.S. Cl.
CPC .......... *B60S 9/04* (2013.01)

(58) Field of Classification Search
CPC .......... E02F 9/085; B60S 9/04; B66C 23/78
USPC .......... 280/763.1
See application file for complete search history.

(56) References Cited

U.S. PATENT DOCUMENTS 3,015,497 A * 1/1962 Aldred, Jr. .......... E02F 3/384 280/755
3,721,458 A * 3/1973 Mitchell .......... E02F 9/085 280/764.1
3,913,942 A * 10/1975 MacKenzie .......... E02F 9/085 280/764.1
3,915,471 A * 10/1975 Tallman .......... B60S 9/02 280/765.1
3,930,668 A 1/1976 Schuermann et al.
4,039,206 A * 8/1977 Nault .......... B66C 23/80 414/718
4,241,803 A * 12/1980 Lauber .......... B60P 3/40 280/765.1
4,421,290 A 12/1983 Frank
4,473,239 A 9/1984 Smart
4,531,883 A * 7/1985 Arnold .......... E02F 9/085 414/722
5,015,008 A * 5/1991 Schupback .......... B60S 9/12 280/764.1
6,164,697 A 12/2000 Riggs
6,386,586 B1 5/2002 Ulery, Jr. et al.
6,634,672 B1 * 10/2003 Lagsdin .......... E02F 9/085 248/188.8
8,496,212 B2 * 7/2013 Keng .......... F16M 11/245 248/168
8,955,611 B1 2/2015 Sharpe
9,567,728 B2 * 2/2017 Colbert .......... E02F 9/085
10,017,989 B1 7/2018 Kellogg
10,322,704 B2 * 6/2019 Nobles .......... E02F 9/085
10,794,041 B2 10/2020 Baucom et al.
11,834,809 B2 * 12/2023 Geng .......... B60S 9/12

* cited by examiner

*Primary Examiner* — Laura Freedman

(74) *Attorney, Agent, or Firm* — Phelps Dunbar LLLP; R. Andrew Patty II; Mary H. Drabnis

(57) ABSTRACT

This invention provides a stabilizer pad for a distal end of a stabilizing arm, a stabilizer pad kit, and a method for stabilizing a mobile unit of equipment equipped with at least one stabilizing arm comprising a distal end.

2 Claims, 2 Drawing Sheets

STABILIZER PAD FOR STABILIZING ARM

TECHNICAL FIELD

This invention relates to a stabilizer pad for a stabilizing arm of a mobile unit of equipment.

BACKGROUND

Mobile units of equipment, usually material-handling apparatus such as utility trucks and backhoes, are operated on various types of terrain in a variety of weather conditions, including wet, dry, and/or icy. These mobile units of equipment typically have one or more stabilizing arms, each stabilizing arm comprising a distal end. Usually, a stabilizer pad is present at the distal end of each stabilizing arm. The stabilizing arm may support all or a portion of the weight of the mobile unit of equipment and the stabilizing arm is intended to limit movement of the mobile unit of equipment during use. Typical stabilizer pads have ground-engaging surfaces which are generally suitable for contacting only one particular type of ground surface or terrain. Mobile units of equipment generally need more than one type of stabilizer pad to accommodate different terrain encountered by the mobile unit of equipment, and typically, the stabilizer pad(s) need to be changed to a different type of stabilizer pad when the mobile unit of equipment will be operated in different terrain.

There remains a need for a stabilizer pad that can accommodate different types of terrain and challenging terrain conditions.

SUMMARY OF THE INVENTION

This invention provides stabilizer pads for distal ends of stabilizing arms of mobile units of equipment, where the distal ends are configured to come into contact with the ground when actuated to stabilize the equipment. An advantage provided at least some aspects of this invention is stabilizer pads that can accommodate different types of terrain and/or terrain conditions; and in at least some aspects of the invention, once the stabilizer pad is coupled to the distal end of the stabilizing arm, there is no need to change the stabilizer pad for different types of terrain.

An embodiment of this invention is a stabilizer pad for a distal end of a stabilizing arm. The stabilizer pad comprises:

- a substantially planar plate defining a plane and having a ground oriented face and an opposing upward oriented face;
- coupling means for coupling the substantially planar plate to the distal end of the stabilizing arm, the coupling means attached to the upward oriented face of the substantially planar plate,
- the substantially planar plate defining a plurality of plate openings in and through the substantially planar plate, each plate opening being sized and configured to receive therethrough a respective spike so that a longitudinal axis of the respective spike is substantially perpendicular relative to the plane defined by the substantially planar plate when the respective spike is inserted into the plate opening.

Another embodiment of this invention is a stabilizer pad kit comprising a substantially planar plate; a plurality of spikes; and an attachment means for detachably attaching a respective spike to the substantially planar plate.

Other embodiments of the invention include a method for stabilizing a mobile unit of equipment equipped with at least one stabilizing arm comprising a distal end and configured to come into contact with the ground when actuated to stabilize the equipment.

These and other embodiments and features of this invention will be still further apparent from the ensuing description and appended claims.

Figure 1:
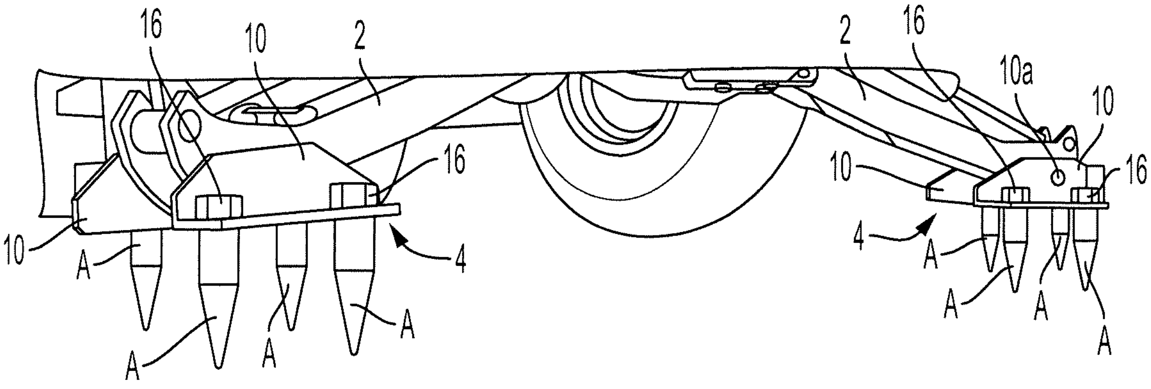
FIG. 1 shows two stabilizing arms, each stabilizing arm having attached thereto a stabilizer pad according to one embodiment of the present invention.

The figures illustrate embodiments of specific aspects of the invention, and are not intended to impose limitations on the scope of the invention.

FURTHER DETAILED DESCRIPTION OF THE INVENTION

As used throughout this document, the word "terrain" is interchangeable with the word "ground."

The one or more stabilizing arms of the mobile unit of equipment maybe attached to the mobile unit of equipment by a central mount or an upright mount (an upright mount is sometimes referred to as a straight or vertical mount). The mobile units of equipment are usually material-handling apparatus such as utility trucks and backhoes.

The stabilizer pad of the present invention comprises a substantially planar plate defining a plane and having a ground oriented face and an opposing upward oriented face, a coupling means, and plurality of plate openings in and through the substantially planar plate. The stabilizer pad is generally attached to a distal end of a stabilizing arm, typically a stabilizing arm of a mobile unit of equipment.

The coupling means is for coupling the substantially planar plate to the distal end of the stabilizing arm. The coupling means is attached to the upward oriented face of the substantially planar plate. In some embodiments, the coupling means defines an opening for a mounting pin. In some preferred embodiments, the coupling means defines an opening for a mounting pin which is a variable-size opening. A variable-size opening can accommodate differently sized stabilizing arm attachment points. Non-limiting examples of alternative coupling means could include, for example, quick-release mechanisms, typically involving latches or clips; magnetic couplings; sliding and locking mechanisms, typically a sliding element that locks into place with a pin or a bolt; threaded fasteners, usually screws or bolts when there are threaded openings on the stabilizing arm; bayonet mounts, which typically have a twist-and-lock mechanism; clamping mechanisms, which usually employ a clamp that can be tightened around the stabilizing arm; hook and loop fasteners, which generally have a hook and loop straps that can wrap around the stabilizing arm and the stabilizer pad; interlocking pieces, in which a stabilizer pad and stabilizing arm have interlocking shapes that fit together; hydraulic or pneumatic couplers, which generally allow for adjustments and detachment by pushing a button; and spring-loaded pins, which typically can be pulled and locked. The coupling means can be selected based on the requirements of the particular situation of the stabilizing arms, and the terrain type and condition.

The substantially planar plate defines a plurality of plate openings in and through the substantially planar plate. Each plate opening is sized and configured to receive therethrough a respective spike so that a longitudinal axis of the respective spike is substantially perpendicular relative to the plane defined by the substantially planar plate when the respective spike is inserted into the plate opening.

In some embodiments, the substantially planar plate is in a shape forming three or more corners, and preferably each plate opening is adjacent to a respective one of the corners formed by the substantially planar plate. In other embodiments, the substantially planar plate is in a rectangular or square shape forming four corners, and preferably each plate opening is adjacent to a respective one of the corners formed by the substantially planar plate.

In some embodiments, the substantially planar plate comprises, at one or more of the plate openings, an upward oriented sleeve and/or a ground oriented sleeve. Each plate opening can independently have no sleeves, only an upward oriented sleeve, only a ground oriented sleeve, or both an upward oriented sleeve and a ground oriented sleeve. In some embodiments, there are one or more plate openings without sleeves and one or more plate openings with sleeves on the same substantially planar plate of the stabilizer pad. In other embodiments, one or more of the plate openings has both an upward oriented sleeve and a ground oriented sleeve. In still other embodiments, all of the plate openings of a stabilizer pad have both an upward oriented sleeve and a ground oriented sleeve.

Each upward oriented sleeve extends substantially perpendicularly from the upward oriented face and defines an upward sleeve opening. Each upward sleeve opening is aligned with a plate opening. The upward oriented sleeve is sized and configured to receive through the upward sleeve opening a spike so that a longitudinal axis of the spike is substantially perpendicular relative to the plane defined by the substantially planar plate. The upward oriented sleeves are preferably welded to the substantially planar plate.

In some embodiments, there is provided attachment means for securely attaching a respective one of the spikes to each of the upward oriented sleeves. In some embodiments, the attachment means for securely attaching a respective one of the spikes to the upward oriented sleeve comprises a retention pin or a retention bolt sized and configured to be received through a bore extending transversely through the upward oriented sleeve.

Each ground oriented sleeve extends substantially perpendicularly from the ground oriented face and defines a lower sleeve opening. Each lower sleeve opening is aligned with a plate opening. The ground oriented sleeve is sized and configured to receive through the lower sleeve opening a spike so that a longitudinal axis of the spike is substantially perpendicular relative to the plane defined by the substantially planar plate. The ground oriented sleeves are preferably welded to the substantially planar plate.

In some embodiments, one or more radially extending supports attached to the ground oriented sleeve and configured for contact with or connection to the ground oriented face are present. In other embodiments, there are two or more of the radially extending supports attached to each ground oriented sleeve and configured for contact with or connection to the ground oriented face. The radially extending supports enhance the strength and durability of the ground oriented sleeve. In some embodiments, the radially extending supports are attached to the ground oriented sleeve by welding; the radially extending supports are preferably connected to the ground oriented face by welding. In some embodiments, the radially extending supports have a triangular shape. The radially extending supports are preferably welded to the ground oriented face of the substantially planar plate, and preferably are also welded to a ground oriented sleeve.

Another embodiment of this invention comprises a mobile unit of equipment equipped with at least one stabilizing arm comprising a distal end configured to come into contact with the ground when actuated to stabilize the equipment in which a stabilizer pad as described above is coupled to the distal end of the stabilizing arm.

The stabilizer pad kit of the present invention comprises A) a substantially planar plate defining a plane and comprising a ground oriented face, an opposing upward oriented face, and a coupling means, B) a plurality of spikes, and C) an attachment means for detachably attaching a respective spike to the substantially planar plate.

The substantially planar plate defines a plurality of plate openings in and through the substantially planar plate, as described above. In some embodiments, the substantially planar plate is in a shape forming three or more or more corners, as described above. In some embodiments, the substantially planar plate comprises, at one or more of the plate openings, an upward oriented sleeve and/or a ground oriented sleeve, as described above.

The coupling means is for coupling the substantially planar plate to the distal end of the stabilizing arm, as described above. In some embodiments in which the coupling means defines an opening for a mounting pin, the stabilizer pad kit comprises a mounting pin sized and configured to be received into the opening for the mounting pin.

When an upward oriented sleeve is present and has an attachment means for securely attaching a respective one of the spikes to each of the upward oriented sleeves, this attachment means is considered to be an attachment means for detachably attaching a respective spike to the substantially planar plate.

Each spike is sized and configured to be received into one or more plate openings of the substantially planar plate. Each respective spike comprises a respective longitudinal axis, a length, a ground end and an upward end; the length of the respective spike allows the spike to extend through the substantially planar plate. Each spike also comprises a receptacle for an attachment means for detachable attachment to the substantially planar plate, and the ground end of each spike comprises a shape.

In some embodiments, the receptacle for an attachment means of one or more of the spikes is a threaded upward end, and the attachment means includes one or more nuts threaded and sized to attach to the threaded upward ends of one or more spikes. In this embodiment, the kit also comprises one or more nuts threaded and sized to attach to the threaded upward ends of one or more spikes.

In other embodiments, the receptacle for an attachment means of one or more of the spikes is a bore extending transversely through and defined by the spike, the bore sized and configured to receive a retention pin or a retention bolt, and one or more retention pins or retention bolts sized and configured to be received into the bore extending transversely through and defined by the spike. In this embodiment, the kit also comprises one or more retention pins or retention bolts sized and configured to be received into the bore extending transversely through and defined by the spike.

When an upward oriented sleeve is present, one or more of the spikes may have a length such that one or more of the spikes extends above the upward end of the upward oriented sleeve.

When a ground oriented sleeve is present, one or more of the spikes may have a length such that the ground end of the spikes extends below the ground oriented sleeve.

In the stabilizer pad kit, one or more of the respective spikes may have a length that is different than the length of one or more of the other spikes, and/or one or more of the respective spikes may have a ground end comprising a different shape than the shape of one or more of the other spikes.

The spikes can be of various lengths, as needed for different terrain types and conditions. Preferably, the stabilizer pad kit contains spikes of various lengths. More preferably, the stabilizer pad kit contains spikes having a length different than the length of one or more of the other spikes, and having more than one spike of each different length. Often, spikes with longer lengths are typically used in muddy terrain to reach more stable soil layers below.

The ground end of a spike can be any of various shapes, such as a rounded point, a flanged point, a planar or flat point similar to an arrowhead, and the ground end may have two or more prongs or points, with the type of ground end spike shape being determined by the terrain and conditions. Preferably, the stabilizer pad kit contains spikes having a ground end comprising a different shape than the shape of one or more of the other spikes. More preferably, the stabilizer pad kit contains spikes having a ground end comprising a different shape than the shape of one or more of the other spikes, and having more than one spike of each different shape. Generally, spikes with ground ends that have broader bases are typically used in swampy or muddy terrain, pointed spikes are typically used in terrain comprising loose sand, and spikes with textured surfaces are typically used for gripping smooth surfaces, such as ice.

In some embodiments, the attachment means for detachably attaching the spikes to the substantially planar plate is a quick-attachment (or quick-release) means for ease of exchange of one spike for another spike having a different length and/or a different ground end shape; in some embodiments, the quick-attachment means is a cotter pin.

Another embodiment of this invention comprises a method for stabilizing a mobile unit of equipment equipped with at least one stabilizing arm comprising a distal end and configured to come into contact with the ground when actuated to stabilize the equipment. The method comprises inserting each of one or more spikes through a respective plate opening defined by a substantially planar plate, and detachably attaching one or more spikes to the substantially planar plate by placing an attachment means in each spike in a receptacle for an attachment means to the substantially planar plate. The stabilizer pad is coupled to the stabilizing arm and the stabilizer pad comprises the substantially planar plate. The substantially planar plate comprises a ground oriented face, an opposing upward oriented face, and coupling means.

In some embodiments, the method also comprises coupling the substantially planar plate to a distal end of a stabilizing arm. The coupling means is for coupling the substantially planar plate to the distal end of the stabilizing arm, as described above. In some embodiments in which the coupling means defines an opening for a mounting pin, a mounting pin sized and configured to be received into the opening for the mounting pin is inserted into the opening for the mounting pin to couple the substantially planar plate to the distal end of the stabilizing arm.

The substantially planar plate defines a plurality of plate openings in and through the substantially planar plate, as described above. In some embodiments, the substantially planar plate is in a shape forming three or more or more corners, as described above. In some embodiments, the substantially planar plate comprises, at one or more of the plate openings, an upward oriented sleeve and/or a ground oriented sleeve, as described above.

When an upward oriented sleeve is present and has an attachment means for securely attaching a respective one of the spikes to each of the upward oriented sleeves, this attachment means is considered to be an attachment means for detachably attaching a respective spike to the substantially planar plate.

Each spike is sized and configured to be received into one or more plate openings of the substantially planar plate. Each respective spike comprises a respective longitudinal axis, a length, a ground end and an upward end, as described above. The spikes can be of various lengths and/or ground end shapes, as described above.

In the inserting step, each of one or more spikes is inserted through a respective plate opening defined by a substantially planar plate. It is not necessary to have spikes inserted into all of the plate openings of a stabilizer pad; preferably, spikes are inserted into all of the plate openings of a stabilizer pad. In some embodiments, all of the spikes have the same length and/or ground end shape. In other embodiments, one or more of the spikes has a different length and/or ground end shape.

In the step of detachably attaching one or more spikes to the substantially planar plate, an attachment means is placed in each spike in a receptacle for an attachment means to the substantially planar plate. The attachment means that is placed into the receptacle for an attachment means of each spike depends on the type of receptacle defined by each spike. For spikes defining a receptacle for an attachment means that is a threaded upward end, the attachment means includes one or more nuts threaded and sized to attach to the threaded upward ends of the spikes. For spikes defining a receptacle for an attachment means that is a bore extending transversely through the spikes, the bore sized and configured to receive a retention pin or a retention bolt, the attachment means includes one or more retention pins or retention bolts sized and configured to be received into the bore extending transversely through and defined by the spikes.

Because the spikes are detachably attached to the substantially planar plate, each spike can be detached at the end of a job, or detached and replaced by another spike for different terrain conditions or when a spike becomes damaged or breaks.

In some embodiments, there is provided attachment means for securely attaching a respective one of the spikes to each of the upward oriented sleeves. In some embodiments, the attachment means for securely attaching a respective one of the spikes to the upward oriented sleeve comprises a retention pin or a retention bolt sized and configured to be received through a bore extending transversely through the upward oriented sleeve and through an aligned bore extending transversely through the spike inside the upward oriented sleeve.

In other embodiments, the attachment means for the spike is a threaded end that extends upward through the substantially planar plate, and, when a portion of the spike is in an upward oriented sleeve, the threaded end of the spike is long enough to extend out of the upward oriented sleeve. When the spike has a threaded end, the attachment means is typically a nut.

In the practice of this invention, one or more spikes extend from the ground oriented face of the substantially planar plate so as to penetrate the ground when the substantially planar plate is coupled to the stabilizing arm and deployed into contact with the ground to stabilize the mobile unit of equipment. When one or more spikes penetrate the surface of the ground, the risk of slippage or toppling of the mobile unit of equipment in adverse terrain conditions is often significantly reduced.

The stabilizer pad and the spikes are normally and preferably made from steel. Attachment means such as retention pins, retention bolts, mounting pins, and nuts are also normally and preferably made from steel.

Turning now to the accompanying figures, FIG. 1 shows two stabilizing arms 2 of a backhoe, each stabilizing arm 2 having attached thereto a stabilizer pad 4 in accordance with one embodiment of this invention. Each stabilizer pad has a plurality of spikes A extending therethrough. An attachment means 16, shown as a threaded nut, is shown for some of the spikes A. Coupling means 10 and an opening 10*a* for the mounting pin are also shown.

Figure 2:
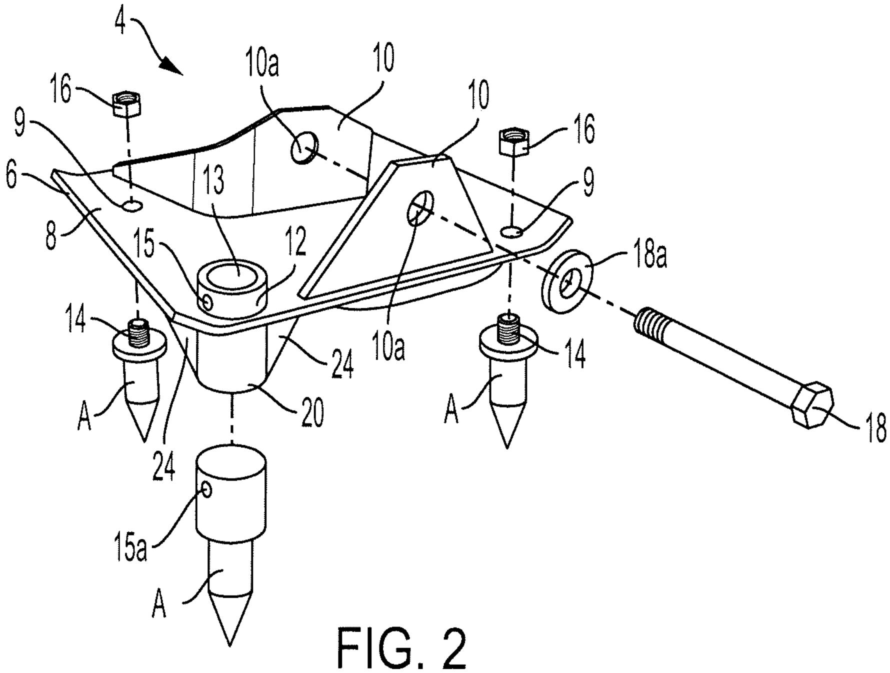
FIG. 2 shows a stabilizing arm with a stabilizer pad according to another embodiment of the present invention, showing the coupling means and the substantially planar plate with spikes therethrough.

FIG. 2 shows a stabilizer pad 4 in accordance with another embodiment of the invention, with a substantially planar plate 6 having an upward oriented face 8 and defining plate openings 9 (not all shown), each having a spike A therethrough. Coupling means 10 is attached to the upward oriented face 8 of the substantially planar plate 6. The substantially planar plate 6 is in a shape forming corners, and each plate opening is adjacent to a respective one of the corners formed by the plate 6. One of the plate openings has an upward oriented sleeve 12 and a ground oriented sleeve 20, which ground oriented sleeve 20 is attached to radially extending supports 24, shown with a triangular shape. The upward oriented sleeve 12 defines an upward sleeve opening 13 and also defines a bore 15 extending transversely through the upward oriented sleeve, the bore 15 sized and configured to receive a retention pin or a retention bolt. Two of the spikes A have a threaded upward end 14, and the attachment means is a nut 16 threaded and sized to attach to the threaded upward end 14. The two spikes A with threaded upward ends are shown with optional flanges that are planar and parallel with the plane of the substantially planar plate 6; the flanges preferably come into contact with the ground oriented face (not shown) of the substantially planar plate 6. The other spike A has an upper portion that is designed to fit into upward oriented sleeve 12, and has a bore 15*a* extending transversely through the spike, the bore 15*a* sized and configured to receive a retention pin or a retention bolt. The coupling means 10 defines an opening 10*a* for a mounting pin, with a mounting pin 18 (with optional washer 18*a*) received into the opening for the mounting pin 10*a*.

Figure 3:
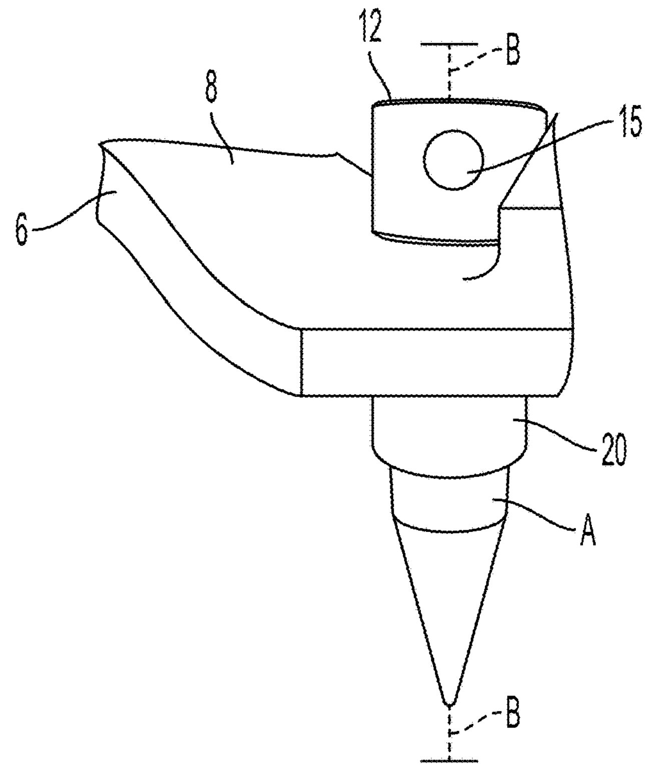
FIG. 3 is a view showing a corner of a substantially planar plate of a stabilizer pad of the embodiment of FIG. 2, with an upward oriented sleeve with a spike through the substantially planar plate.

FIG. 3 shows a portion of a substantially planar plate 6 according to one embodiment of the invention, defining a plate opening (not shown). The portion of the substantially planar plate 6 is in a shape forming a corner, and the plate opening is adjacent to the corner. The substantially planar plate 6 has an upward oriented sleeve 12 extending substantially perpendicularly from the upward oriented face 8. The upward oriented sleeve 12 defines an upward sleeve opening (not shown) that is aligned with the plate opening. The upward oriented sleeve opening 12 also defines a bore 15 extending transversely through the upward oriented sleeve, the bore 15 sized and configured to receive a retention pin or a retention bolt. A ground oriented sleeve 20 extends substantially perpendicularly from the ground oriented face (not visible) of the substantially planar plate 6. The ground oriented sleeve 20 defines a lower sleeve opening (not shown) that is aligned with the plate opening. The upward oriented sleeve 12 and the ground oriented sleeve 20 are sized and configured to receive therethrough a spike A through the upward sleeve opening and through the lower sleeve opening. The spike A extends through the substantially planar plate 6 through the plate opening such that a longitudinal axis B of the spike A is substantially perpendicular relative to the plane defined by the substantially planar plate 6.

Figure 4:
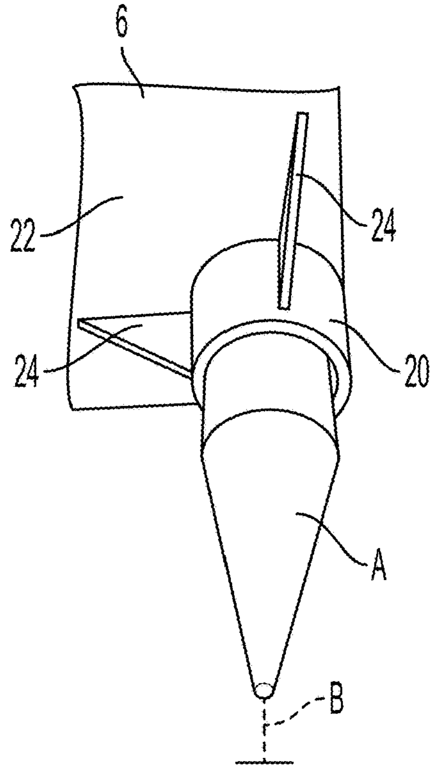
FIG. 4 is a view showing a corner of a substantially planar plate of a stabilizer pad in accordance with the embodiment of FIG. 2, with a ground oriented sleeve having radially extending supports attached to the ground oriented sleeve and configured for contact with or connection to the ground oriented face and a spike through the substantially planar plate.

FIG. 4 shows a portion of a substantially planar plate 6 according to one embodiment of the invention, defining a plate opening (not shown). The portion of the substantially planar plate 6 is in a shape forming a corner, and the plate opening is adjacent to the corner. The substantially planar plate 6 has a ground oriented sleeve 20 extending substantially perpendicularly from the ground oriented face 22. The ground oriented sleeve 20 defines a lower sleeve opening that is aligned with the plate opening. The ground oriented sleeve 20 is sized and configured to receive through a lower sleeve opening (not shown) a spike A so that a longitudinal axis B of the spike is substantially perpendicular relative to the plane defined by the substantially planar plate 6. The spike A extends through the substantially planar plate 6 through the plate opening such that the longitudinal axis B of the spike A is substantially perpendicular relative to the plane defined by the substantially planar plate 6. The ground oriented sleeve 20 has radially extending supports 24 attached to the ground oriented sleeve 20 and configured for contact with or connection to the ground oriented face 22. The radially extending supports 24 as shown are triangular in shape.

Figure 5:
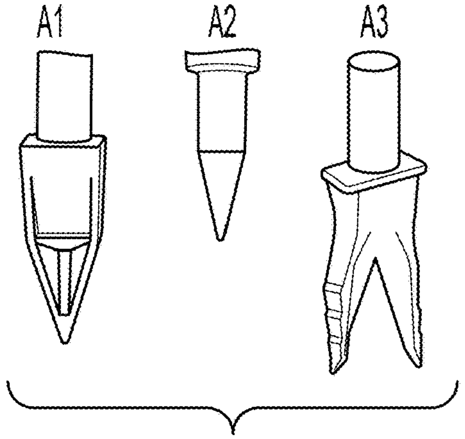
FIG. 5 shows some examples of shapes for ground ends of spikes that are suitable for use in the practice of various embodiments of this invention.

FIG. 5 shows some examples of shapes for ground ends of spikes that are suitable for use in the practice of various embodiments of this invention. Spike A1 has a flanged pointed shape; spike A2 has a rounded point shape; and spike A3 has a shape comprising two prongs or points. Of course, other shapes and configurations of ground ends of the spikes can be envisioned for use in varying circumstances, once one has the benefit of this disclosure.

The stabilizer pads provided by this invention provide a solution to the instability of mobile units of equipment, especially when operating in challenging terrain, and the stabilizer pads provided by this invention help to ensure operational safety and efficiency. The interchangeability of spikes in the stabilizer pads provided by this invention allows adaptation to various terrain conditions without removing or changing the stabilizer pad of a stabilizing arm of a mobile unit of equipment.

1 Further embodiments of the invention include, without limitation:

A) A stabilizer pad for a distal end of a stabilizing arm, the stabilizer pad comprising:

a substantially planar plate defining a plane and having a ground oriented face and an opposing upward oriented face;

coupling means for coupling the substantially planar plate to the distal end of the stabilizing arm, the coupling means attached to the upward oriented face of the substantially planar plate, the substantially planar plate defining a plurality of plate openings in and through the substantially planar plate, each plate opening being sized and configured to receive therethrough a respective spike so that a longitudinal axis of the respective spike is substantially perpendicular relative to the plane defined by the substantially planar plate when the respective spike is inserted into the plate opening.

B) The stabilizer pad as in A) wherein the substantially planar plate is in a shape forming three or more corners, and wherein each plate opening is adjacent to a respective one of the corners formed by the plate.

C) The stabilizer pad as in A) or B) wherein the coupling means defines an opening for a mounting pin.

D) The stabilizer pad as in Claim 1 wherein the substantially planar plate comprises, at one or more of the plate openings:

a) an upward oriented sleeve defining an upward sleeve opening and extending substantially perpendicularly from the upward oriented face, the upward sleeve opening being aligned with the plate opening, the upward oriented sleeve being sized and configured to receive through the upward sleeve opening a spike so that a longitudinal axis of the spike is substantially perpendicular relative to the plane defined by the substantially planar plate, and/or b) a ground oriented sleeve defining a lower sleeve opening and extending substantially perpendicularly from the ground oriented face, the lower sleeve opening being aligned with the plate opening, the ground oriented sleeve being sized and configured to receive through the lower sleeve opening a spike so that a longitudinal axis of the spike is substantially perpendicular relative to the plane defined by the substantially planar plate.

E) The stabilizer pad of D) wherein when one or more ground oriented sleeves are present, one or more radially extending supports attached to the ground oriented sleeve and configured for contact with or connection to the ground oriented face is present.

F) The stabilizer pad of D) or E) wherein when one or more upward oriented sleeves are present, there is provided attachment means for securely attaching a respective one of the spikes to each of the upward oriented sleeves.

G) The stabilizer pad of any one of D)-F) wherein the substantially planar plate comprises, at each of the one or more plate openings, both i) an upward oriented sleeve and ii) a ground oriented sleeve.

H) In a mobile unit of equipment equipped with at least one stabilizing arm comprising a distal end configured to come into contact with the ground when actuated to stabilize the equipment, the improvement comprising the stabilizer pad of any one of A)-G) coupled to the distal end of the stabilizing arm.

I) A stabilizer pad kit comprising:

i) a substantially planar plate defining a plane and comprising:

a ground oriented face, an opposing upward oriented face, and coupling means for coupling the substantially planar plate to a distal end of a stabilizing arm, the coupling means attached to the upward oriented face of the substantially planar plate, the substantially planar plate defining a plurality of plate openings in and through the substantially planar plate, each plate opening being sized and configured to receive therethrough a respective spike so that a longitudinal axis of the respective spike is substantially perpendicular relative to the plane defined by the substantially planar plate when the respective spike is inserted into the plate opening;

ii) a plurality of spikes, each spike sized and configured to be received into one or more plate openings of the substantially planar plate, each respective spike comprising a respective longitudinal axis, a length, a ground end and an upward end, wherein the length of the respective spike allows the spike to extend through the substantially planar plate, each spike also comprising a receptacle for an attachment means for detachable attachment to the substantially planar plate, and the ground end of each spike comprising a shape; and iii) an attachment means for detachably attaching a respective spike to the substantially planar plate.

J) The stabilizer pad kit as in I) wherein the substantially planar plate is in a shape forming three or more corners, and wherein each plate opening is adjacent to a respective one of the corners formed by the plate.

K) The stabilizer pad kit as in I) or J) wherein the coupling means defines an opening for a mounting pin, and wherein the kit comprises a mounting pin sized and configured to be received into the opening for a mounting pin.

L) The stabilizer pad kit as in any one of I)-K) wherein the substantially planar plate comprises, at one or more of the plate openings:

a) an upward oriented sleeve defining an upward sleeve opening and extending substantially perpendicularly from the upward oriented face, the upward sleeve opening being aligned with the plate opening, the upward oriented sleeve being sized and configured to receive through the upward sleeve opening a spike so that a longitudinal axis of the spike is substantially perpendicular relative to the plane defined by the substantially planar plate, and/or b) a ground oriented sleeve defining a lower sleeve opening and extending substantially perpendicularly from the ground oriented face, the lower sleeve opening being aligned with the plate opening, the ground oriented sleeve being sized and configured to receive through the lower sleeve opening a spike so that a longitudinal axis of the spike is substantially perpendicular relative to the plane defined by the substantially planar plate.

M) The stabilizer pad kit as in L) wherein when one or more ground oriented sleeves are present, one or more radially extending supports attached to the ground oriented sleeve and configured for contact with or connection to the ground oriented face is present.

N) The stabilizer pad kit as in L) or M) wherein when one or more upward oriented sleeves are present, there is provided attachment means for securely attaching a respective one of the spikes to each of the upward oriented sleeves.

O) The stabilizer pad kit as in any one of L)-N) wherein the substantially planar plate has, at each of the one or more plate openings, both i) an upward oriented sleeve and ii) a ground oriented sleeve.

P) The stabilizer pad kit as in any one of I)-O) wherein the receptacle for an attachment means of one or more of the spikes is:
- a threaded upward end, and the attachment means includes one or more nuts threaded and sized to attach to the threaded upward ends of one or more spikes; or
- a bore extending transversely through and defined by the spike, the bore sized and configured to receive a retention pin or a retention bolt, and the kit also comprises one or more retention pins or retention bolts sized and configured to be received into the bore extending transversely through and defined by the spike.

Q) The stabilizer pad kit as in any one of I)-P) wherein one or more of the respective spikes has a length that is different than the length of one or more of the other spikes, and/or wherein one or more of the respective spikes has one or more points that is different than the one or more points of one or more of the other spikes.

R) A method for stabilizing a mobile unit of equipment equipped with at least one stabilizing arm comprising a distal end and configured to come into contact with the ground when actuated to stabilize the equipment, the method comprising:
- inserting each of one or more spikes through a respective plate opening defined by a substantially planar plate, wherein the stabilizer pad is coupled to the stabilizing arm and the stabilizer pad comprises the substantially planar plate, the substantially planar plate defining a plane and comprising:
  - a ground oriented face,
  - an opposing upward oriented face, and
  - coupling means for coupling the substantially planar plate to a distal end of the stabilizing arm, the coupling means attached to the upward oriented face of the substantially planar plate,
  - the substantially planar plate defining a plurality of plate openings in and through the substantially planar plate, each plate opening being sized and configured to receive therethrough a respective spike so that a longitudinal axis of the respective spike is substantially perpendicular relative to the plane defined by the substantially planar plate when the respective spike is inserted into the plate opening, and
- detachably attaching one or more spikes to the substantially planar plate by placing an attachment means in each spike in a receptacle for an attachment means to the substantially planar plate.

S) The method as in R) also comprising coupling the substantially planar plate to a distal end of a stabilizing arm.

T) The method as in R) or S) wherein the coupling means defines an opening for a mounting pin.

U) The method as in any one of R)-T) wherein the substantially planar plate is in a shape forming three or more corners, and wherein each plate opening is adjacent to a respective one of the corners formed by the plate.

V) The method as in any one of R)-U) wherein the substantially planar plate comprises, at one or more of the plate openings:
- a) an upward oriented sleeve defining an upward sleeve opening and extending substantially perpendicularly from the upward oriented face, the upward sleeve opening being aligned with the plate opening, the upward oriented sleeve being sized and configured to receive through the upward sleeve opening a spike so that a longitudinal axis of the spike is substantially perpendicular relative to the plane defined by the substantially planar plate, and/or
- b) a ground oriented sleeve defining a lower sleeve opening and extending substantially perpendicularly from the ground oriented face, the lower sleeve opening being aligned with the plate opening, the ground oriented sleeve being sized and configured to receive through the lower sleeve opening a spike so that a longitudinal axis of the spike is substantially perpendicular relative to the plane defined by the substantially planar plate.

W) The method as in V) wherein when one or more ground oriented sleeves are present, one or more radially extending supports attached to the ground oriented sleeve and configured for contact with or connection to the ground oriented face is present.

X) The method as in V) or W) wherein when one or more upward oriented sleeves are present, there is provided attachment means for securely attaching a respective one of the spikes to each of the upward oriented sleeves.

Y) The method as in any one of V)-X) wherein the substantially planar plate has, at each of the one or more plate openings, both i) an upward oriented sleeve and ii) a ground oriented sleeve.

Z) The method as in any one of R)-Y) wherein the receptacle for an attachment means of one or more of the spikes is:
- a threaded upward end, and the attachment means includes one or more nuts threaded and sized to attach to the threaded upward ends of one or more spikes; or
- a bore extending transversely through and defined by the spike, the bore sized and configured to receive a retention pin or a retention bolt, and one or more retention pins or retention bolts sized and configured to be received into the bore extending transversely through and defined by the spike.

AA) The method as in any one of R)-Z) wherein one or more of the respective spikes has a length that is different than the length of one or more of the other spikes, and/or wherein one or more of the respective spikes has one or more points that is different than the one or more points of one or more of the other spikes.

The invention may comprise, consist, or consist essentially of the materials and/or procedures recited herein.

As used herein, the term “about” modifying a quantity in the invention or employed in the methods of the invention refers to variation in the numerical quantity that can occur, for example, through typical measuring and handling procedures in the real world; through inadvertent error in these procedures; through differences in the manufacture and/or source. Whether or not modified by the term “about”, the claims include equivalents to the quantities recited.

Except as may be expressly otherwise indicated, the article “a” or “an” if and as used herein is not intended to limit, and should not be construed as limiting, the description or a claim to a single element to which the article refers. Rather, the article "a" or "an" if and as used herein is intended to cover one or more such elements, unless the text expressly indicates otherwise.

This invention is susceptible to considerable variation in its practice. Therefore the foregoing description is not intended to limit, and should not be construed as limiting, the invention to the particular exemplifications presented hereinabove.

The invention claimed is:

1. A stabilizer pad kit comprising:

A) a substantially planar plate defining a plane and comprising:

a ground oriented face, an opposing upward oriented face, and coupling means for coupling the substantially planar plate to a distal end of a stabilizing arm, the coupling means attached to the upward oriented face of the substantially planar plate, the substantially planar plate defining a plurality of plate openings in and through the substantially planar plate, each plate opening being sized and configured to receive therethrough a spike so that a longitudinal axis of the spike is substantially perpendicular relative to the plane defined by the substantially planar plate when the spike is inserted into the plate opening;

B) an attachment means for detachably attaching the spike to the substantially planar plate;

C) a plurality of the spikes, each spike sized and configured to be received into one or more plate openings of the substantially planar plate, each spike comprising a longitudinal axis, a length, a ground end and an upward end, wherein the length of the spike allows the spike to extend through the substantially planar plate, each spike also comprising a receptacle for the attachment means for detachable attachment to the substantially planar plate, and the ground end of each spike comprising a shape, wherein one or more of the spikes has a length that is different than the length of one or more of the other spikes, and/or wherein one or more of the spikes has one or more points that is different than the one or more points of one or more of the other spikes.

2. A method for stabilizing a mobile unit of equipment equipped with at least one stabilizing arm comprising a distal end and configured to come into contact with ground when actuated to stabilize the equipment, the method comprising:

inserting each of one or more spikes through a plate opening defined by a substantially planar plate, wherein a stabilizer pad is coupled to the stabilizing arm and the stabilizer pad comprises the substantially planar plate, the substantially planar plate defining a plane and comprising:

a ground oriented face, an opposing upward oriented face, and coupling means for coupling the substantially planar plate to the distal end of the stabilizing arm, the coupling means attached to the upward oriented face of the substantially planar plate, the substantially planar plate defining a plurality of the plate openings in and through the substantially planar plate, each plate opening being sized and configured to receive therethrough a spike so that a longitudinal axis of the spike is substantially perpendicular relative to the plane defined by the substantially planar plate when the spike is inserted into the plate opening, and detachably attaching one or more of the spikes to the substantially planar plate by placing an attachment means in each spike in a receptacle for the attachment means to the substantially planar plate, wherein one or more of the spikes has a length that is different than the length of one or more of the other spikes, and/or wherein one or more of the spikes has one or more points that is different than the one or more points of one or more of the other spikes.

* * * * *